United States Patent Office 3,584,359
Patented June 15, 1971

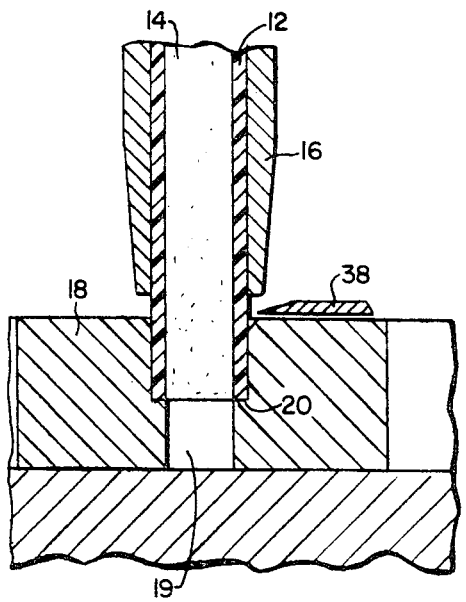
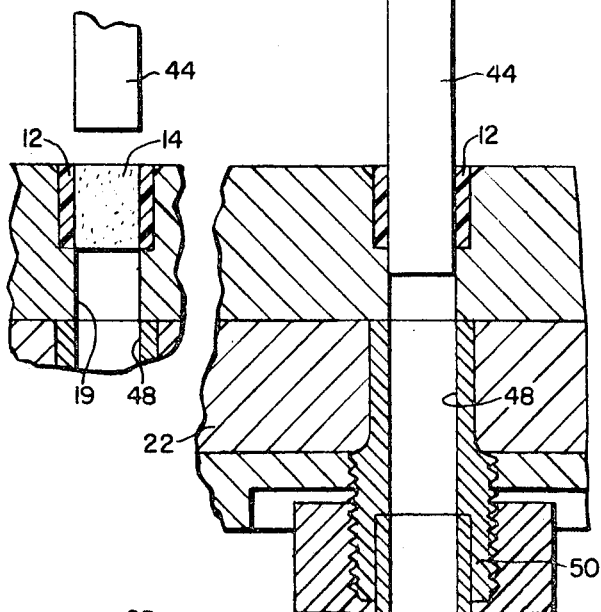
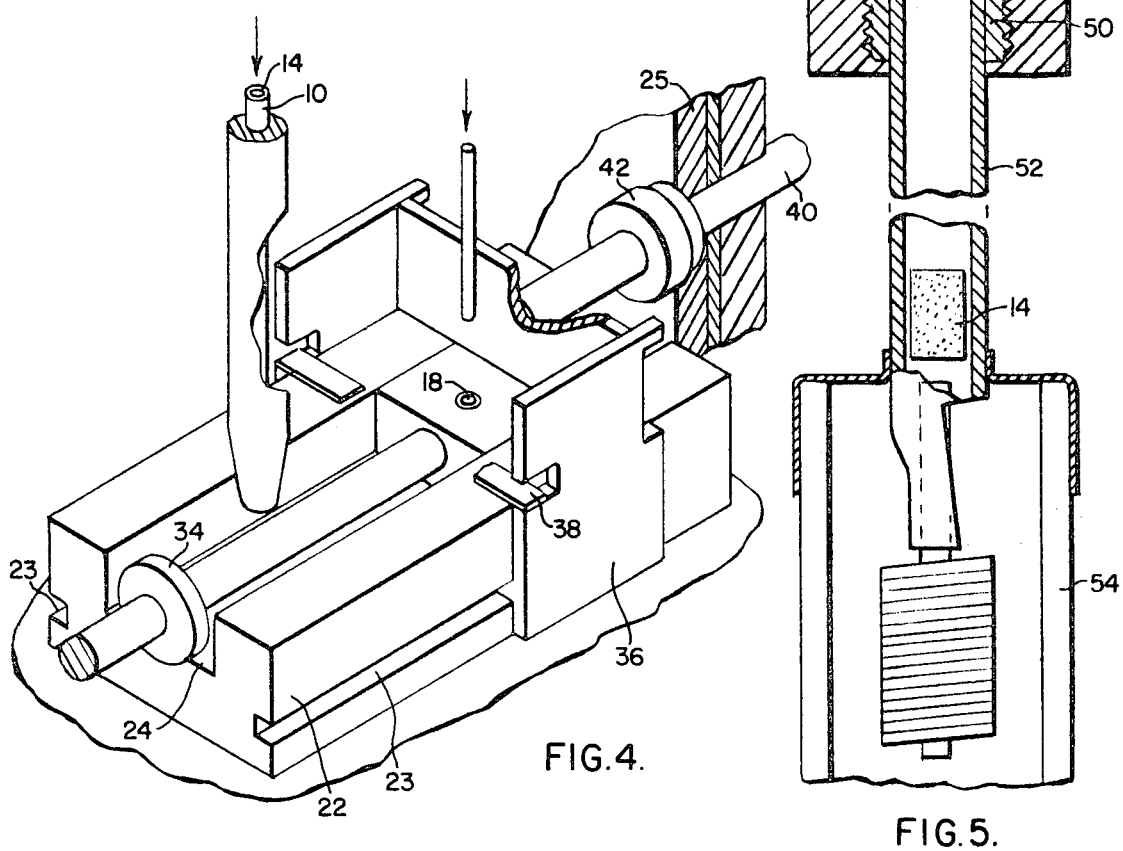
FIG.2.
FIG.3.
FIG.4.
FIG.5.

3,584,359
MEASURED AND APPARATUS FOR DISPENSING MEASURED QUANTITIES OF HIGHLY OXYGEN REACTANT MATERIALS
Leo C. Werner, Cedar Grove, and Thomas J. Brady, Irvington, N.J., assignors to Westinghouse Electric Corporation, Pittsburgh, Pa.
Filed Mar. 7, 1969, Ser. No. 805,232
Int. Cl. H01j 9/00
U.S. Cl. 29—25.11   3 Claims

ABSTRACT OF THE DISCLOSURE

An apparatus and method for introducing highly oxygen reactant materials in measured quantities into a gas discharge device which comprises cutting off a predetermined length of the material from a source of the material which is encased in an indeterminate length of polyethylene tubing and extruding the material from the cut-off predetermined length of tubing into the exhaust and fill tubulation of a gas discharge device. The cutting and extruding operations are preferably performed in an inert atmosphere.

BACKGROUND OF THE INVENTION

This invention relates to the preparation and handling of highly oxygen reactive materials of measured quantities and more particularly to an apparatus and method for providing predetermined quantities of sodium for use in gas discharge devices.

In many manufacturing processes it is necessary to handle materials which are highly deliquescent when exposed to air or may even react violently when exposed to air. This problem is especially severe in the manufacture of additive type discharge lamps on a production basis where a constituent of the discharge sustaining fill is an element such as sodium, cesium or gallium. Because of its strong radiations in the visible range of the spectrum sodium is a very desirable element for use in the discharge sustaining fill of a gas discharge lamp. Handling sodium however is very difficult since it corrodes rapidly in air and will react violently with water generating hydrogen or heat either of which may cause the sodium to ignite. Since these oxygen reactant materials must be supplied to the discharge device in specific quantities, preparation of a suitable size charge of the material is quite difficult because the atmosphere in which it is to be handled must necessarily be inert.

SUMMARY OF THE INVENTION

It is an object of this invention to provide a method, and apparatus for performing that method, to handle highly oxygen reactant materials on a production basis.

Another object of the present invention is to provide a method for handling sodium in a manner which will prevent its reacting with air or water generating hydrogen.

Yet another object of this invention is to provide a method for dispensing predetermined amounts of highly oxygen reactant sodium and an apparatus to practice such method.

A still further object of this invention is to provide a method by which highly oxygen and hydrogen reactant sodium may be introduced into a discharge device in predetermined quantities while avoiding any reaction in which the sodium is involved.

The foregong objects are accomplished in accordance with the present invention by providing a method for introducing a measured quantity of highly oxygen reactant material into a discharge lamp which comprises the steps of encasing the material in a length of plastic tubing, introducing a portion of at least one end of the tubing containing the material into an essentially inert atmosphere; severing a measured length of the tubing containing a predetermined volume of the material from the remainder of the length of tubing; positioning the measured length of tubing adjacent the exhaust and fill tubulation of a discharge device; and extruding the predetermined quantity of material from the measured length of tubing into the discharge device.

BRIEF DESCRIPTION OF THE DRAWING

The foregoing objects, and others, along with many of the attendant advantages of the present invention will become more readily apparent and better understood as the following detailed description is considered in connection with the accompanying drawing in which:

FIG. 2 is a sectional view of the measuring and cutting portions of the present invention;

FIG. 3 is a sectional view illustrating a measured quantity of material prior to ejection;

FIG. 4 is an isometric view illustrating portions of the cutting, transfer and ejection mechanisms of the present invention; and FIG. 5 is a sectional view illustrating the ejection mechanism of the present invention.

DESCRIPTION OF THE PREFERRED EMBODIMENT

Figure 1:
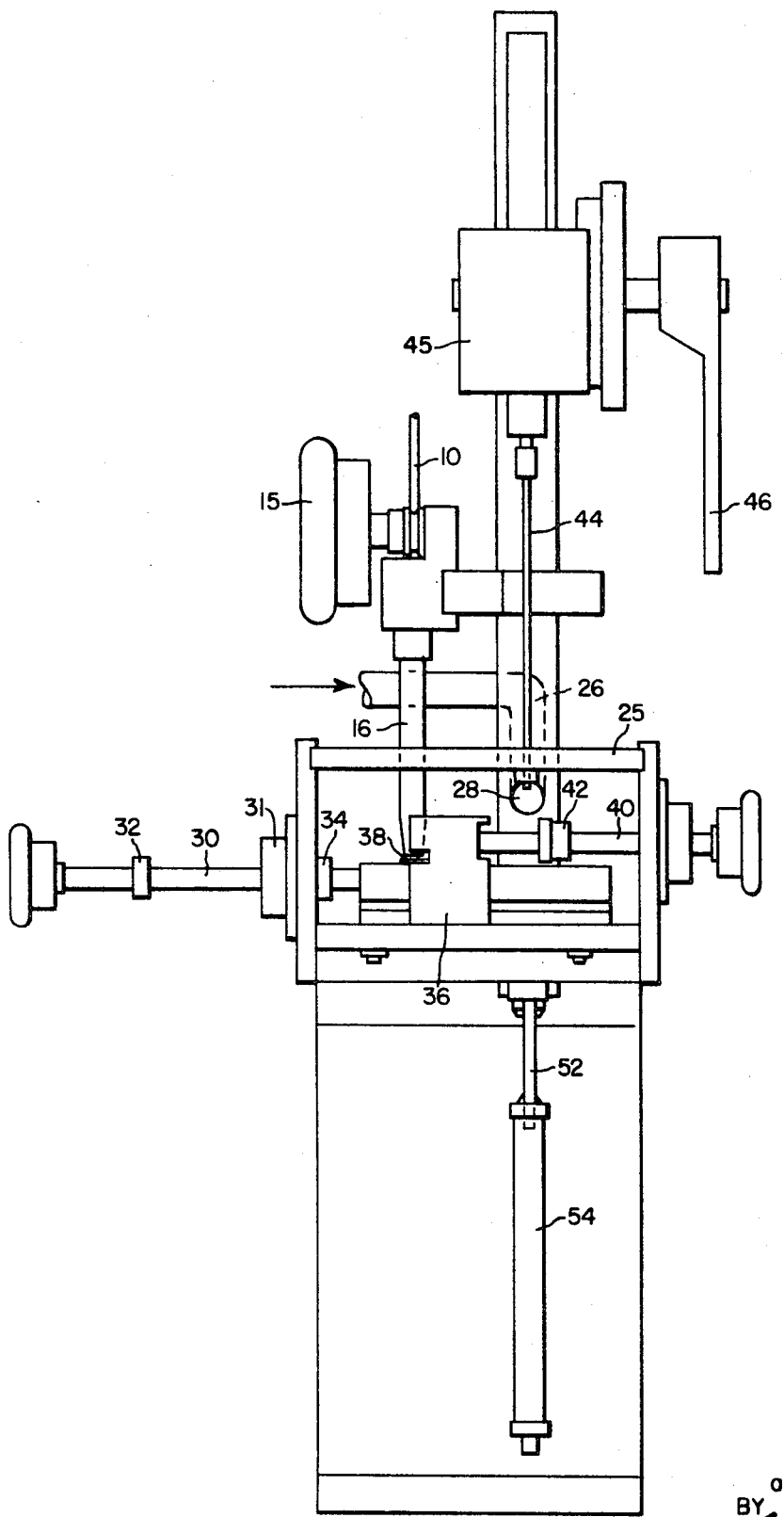
FIG. 1 is a side elevation view of an apparatus constructed in accordance with this invention and adapted to practice the method of this invention.

For many years the use of materials which are highly reactive with an ambient atmosphere have been a problem in the production of gas discharge lamps of the additive type. With the advent of the ceramic bodied discharge lamp the use of sodium which when employed in a gas discharge produces strong radiations near the middle of the visible spectrum or more particularly the area of the visible spectrum to which the eye is most sensitive has become more realistically possible since the ceramic arc tube is not as susceptible to attack by the sodium as is the conventional quartz arc tube. It has become necessary to devise methods and means for getting sodium into the lamps. Sodium is highly reactive with normal atmospheres and tends to oxidize rapidly. In atmospheres containing a high moisture content even violent reactions can occur when pure sodium is contacted by such an atmosphere.

The inventors have found that it is common practice to produce electrical conductors which include a pure sodium core coated or encased in a plastic tube. Pure sodium which has been melted into a polyethylene tube for use as a certain kind of electrical conductor is available commercially from the Chemicals and Plastics Division of Union Carbide Corporation. Reels of wire up to 500 feet in length are available.

This sodium wire comprises a core of pure sodium surrounded by a polyethylene wall. Examples of such wire are wires 500 feet in length containing solid sodium at 60 and 80 mil diameters each having a 30 mil polyethylene wall of tube thereabout.

The volume of sodium in such wire is uniform per unit of length and in accordance with the present invention if a predetermined length of wire is cut off and the sodium core extruded from the polyethylene tubing, a slug of sodium of measured quantity can be ejected from the tubing into a gas discharge lamp.

Referring now in detail to the drawings wherein like reference characters represent like parts throughout the several views, there is shown in FIG. 1 a side elevational view of a mechanism for practicing the present invention. As best seen in FIGS. 1, 2 and 4 the sodium wire 10 having a polyethylene coating or cover 12 and a sodium core 14 is delivered by means of a drive reel 15 through a guide tube 16 into a two part cavity 19 in measuring block 18. The measuring block 18 has a shoulder 20 which divides the two parts of cavity 19 and determines the depth to which the wire 10 will be permitted to extend into the measuring block 18. The measuring block 18 is mounted for reciprocal movement in a guide block 22. Guide block 22 is mounted within an enclosed flow box 25 through which argon is permitted to flow by means of conduit 26 so that the atmosphere within the box 25 is essentially an argon atmosphere to prevent the ends of the sodium wire from oxidizing. The position of the entrance opening 28 of the argon entrance conduit 26 is significant for a reason that will be later described. The flow box 25 is not a sealed container and argon will leak therefrom during operation of the device.

The measuring block 18 is moved from its wire receiving and measuring position to its wire ejection position by means of a push rod 30 having stops 32 and 34 thereon which control the extent of movement of measuring block 18. Also mounted for reciprocal motion in guides 23 of block 22 is the cutting blade carriage 36 which carries thereon a cutting blade 38. An ejection plunger 44 is positioned above and extends into the flow box 24 and is actuated by a crank lever 46 in a manner that will be later described. The cutter blade carriage 36 is actuated by operating rod 40 which also includes a stop 42. An opening 48 extends through the bottom of box 24 and guide block 22 which is adapted to be aligned with the bottom portion of aperture 19 in measuring block 18 through the operation of stop 32 on rod 30 contacting bushing 31 to position the measuring block 18 in the ejection position as illustrated in FIG. 3. A bushing 50 secured to aperture 48 is adapted to receive the exhaust and fill tubulation 52 of a ceramic discharge lamp 54 and align the tubulation with the aperture 48 and aperture 19.

In operation, drive reel 15 is rotated causing the sodium wire 10 to be fed through guide tube 16 until it abuts the shoulder 20 in aperture 19 of measuring block 18 thus measuring a specific length of tubing and hence a specific quantity of sodium. At this point lever arm 40 is moved to the left as seen in FIG. 1 causing the cutting blade 38 to sever the sodium wire and thus separate from the remainder of the wire, a measured length of sodium wire containing a measured quantity of pure sodium. Blade carriage 36 is then retracted or as illustrated in FIG. 1, moved to the right by means of push rod 40. Push rod 30 is then also moved to the right until the stop 32 abuts the bushing 31 on the flow through box 25. When the stop 32 is in contact with the bushing 31 the aperture 19 in measuring block 18 is in alignment with aperture 48 in guide block 22 and hence also in alignment with the exhaust and fill tubulation 52 of the ceramic discharge lamp 54. Lever arm 46 is now rotated causing rack and pinion 45 to drive the ejection plunger 44 into the end of the measured length of sodium wire extruding the sodium from its surrounding polyethylene sleeve as best illustrated in FIGS. 3 and 5. When in the FIG. 5 position the sodium 14 has been ejected from the polyethylene sleeve 12 and falls freely into the exhaust and fill tubulation 52 of the ceramic discharge lamp. The ejection plunger is now withdrawn from the measuring block 18 and as it is withdrawn it carries the remaining polyethylene tubing 12 with it. The ejection plunger 44 is then withdrawn to a position at which its lower end is above the stripper bushing 56 which is affixed to the underside of the top member of flow through box 25. As the ejection plunger is withdrawn into the stripper bushing 56 the polyethylene tubing is stripped therefrom and blown out of the way by the incoming argon entering through opening 28 in the argon supply tube 26.

The size of the sodium charge can be readily adjusted or changed merely by substituting a different measuring block 18 having the shoulder 20 located a different distance below the top surface of the measuring block. Because the sodium wire is uniformly formed the height of the cutoff section is a direct measurement of the sodium charge.

As will be seen from the foregoing the apparatus and method of the present invention provides for the measuring and severing of a predetermined quantity of sodium as well as the transporting and introduction of that measured quantity of sodium to and into the ceramic discharge lamp in a semiautomatic fashion. The sodium is at no time exposed to deleterious effects of an atmosphere containing oxygen or having a high moisture content.

To reiterate the operation briefly, the sodium wire is fed through guide tube 16 and enters a measuring block 18 to a predetermined depth, a measured quantity of the sodium wire is then severed from the wire supply, transferred to an ejection position and the pure sodium extruded from its surrounding polyethylene cover directly into the exhaust and fill tubulation of a gas discharge device.

While the present invention has been described with reference to a particular embodiment thereof, it will be understood that numerous modifications may be made by those skilled in the art without departing from the scope of this invention.

What we claim is:

1. The method of introducing a measured quantity of highly oxygen reactant material into a discharge lamp comprising the steps of:
   encasing the material in a length of plastic tubing;
   introducing a portion of one end of the tubing containing said material into an essentially inert atmosphere;
   severing a measured length of said tubing containing a predetermined quantity of said material from the remainder of said length of tubing;
   positioning said measured length of tubing proximate the exhaust and fill tubulation of a discharge device; and
   extruding said predetermined quantity of said material from said measured length of tubing into said discharge device.

2. The method according to claim 1 wherein said highly oxygen reactant material is sodium and said plastic tubing is polyethylene.

3. The method according to claim 2 wherein said inert atmosphere is argon.

References Cited
UNITED STATES PATENTS 3,143,231    8/1964    Guilloteau et al. _____ 214—305

FOREIGN PATENTS 1,066,575    4/1967    Great Britain.

ANDREW R. JUHASZ, Primary Examiner

L. GILDEN, Assistant Examiner

U.S. Cl. X.R.

141—1; 316—20